Feb. 6, 1962 A. CANDELISE 3,019,777
AIR INJECTION SYSTEM FOR AN INTERNAL COMBUSTION ENGINE
Filed March 4, 1960 4 Sheets-Sheet 1
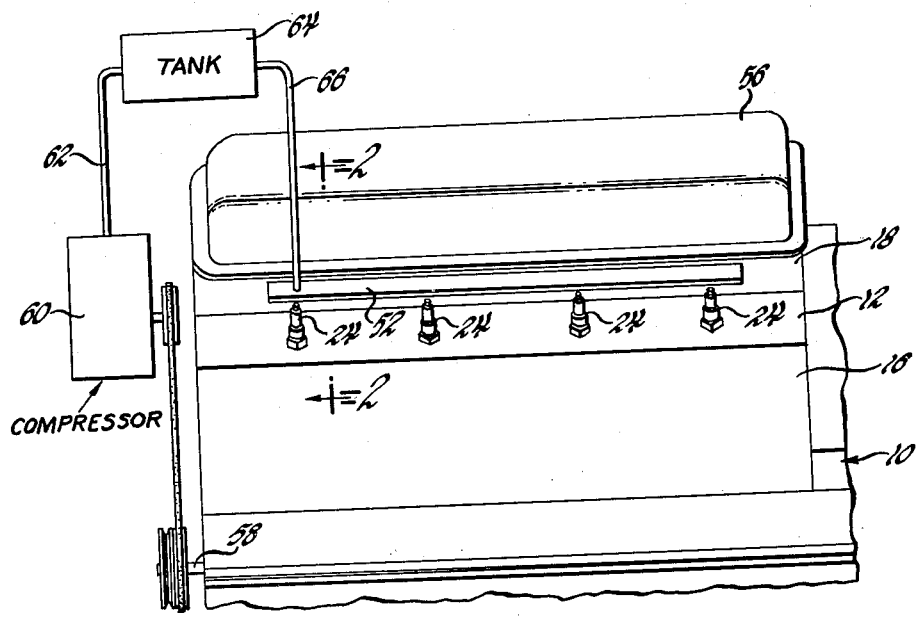
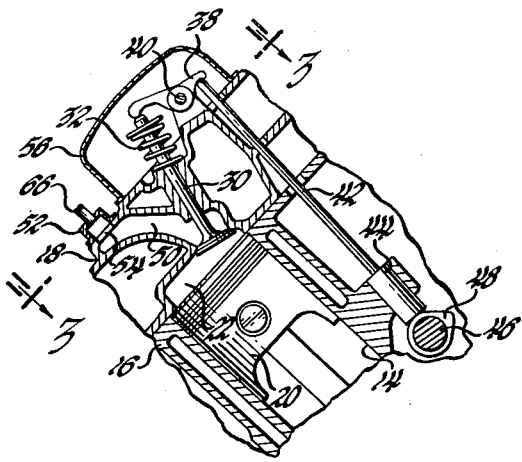
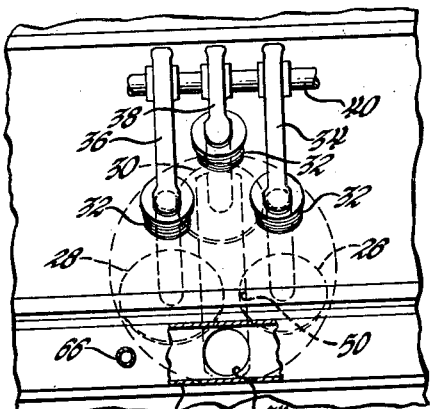
INVENTOR.
Alfred Candelise
BY
*[signature]*
ATTORNEY Feb. 6, 1962 A. CANDELISE 3,019,777
AIR INJECTION SYSTEM FOR AN INTERNAL COMBUSTION ENGINE
Filed March 4, 1960 4 Sheets-Sheet 2

INVENTOR.
Alfred Candelise
BY
A. D. McGraw
ATTORNEY

INVENTOR.
Alfred Candelise
BY
ATTORNEY

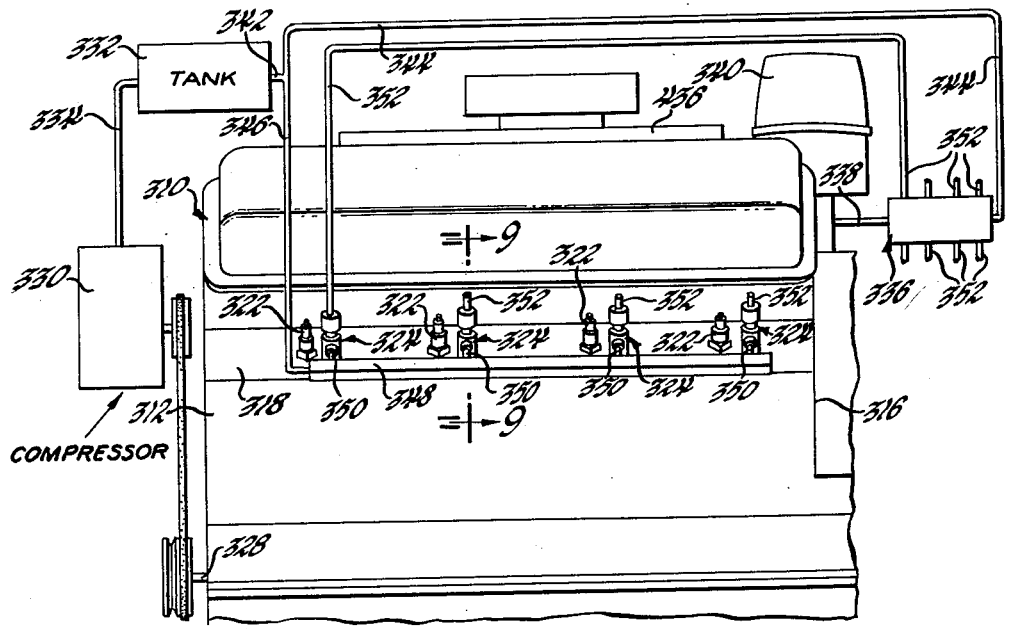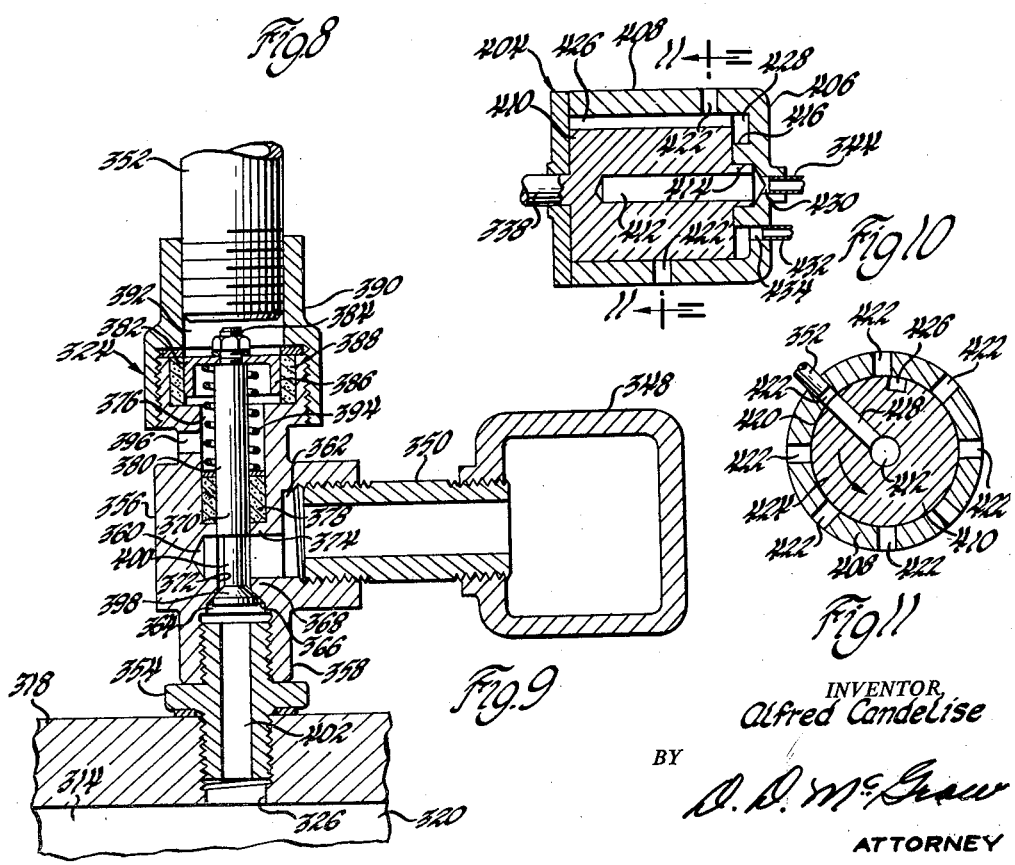

United States Patent Office 3,019,777
Patented Feb. 6, 1962

3,019,777
AIR INJECTION SYSTEM FOR AN INTERNAL
COMBUSTION ENGINE
Alfred Candelise, Flint, Mich., assignor to General Motors Corporation, Detroit, Mich., a corporation of Delaware
Filed Mar. 4, 1960, Ser. No. 12,855
4 Claims. (Cl. 123—26)

The invention relates to a system for injecting compressed air into the combustion chambers of an internal combustion engine during the engine expansion strokes in order to more completely burn the fuel contained therein. It has been found that one of the major sources of atmospheric contamination is the unburned fuel passing through the combustion chambers of an engine and exhausted therefrom, particularly at idle and low speed operating conditions. By injecting compressed air during the latter portion of the combustion step, the otherwise unburned hydrocarbons will be provided with sufficient oxygen to burn while still in the engine combustion chambers. This will result in substantially complete elimination of the carbon monoxide content of the exhaust gases as well as other unburned hydrocarbons. It also increases engine power and efficiency.

A generally similar system is disclosed in my co-pending application S.N. 12,857, filed March 4, 1960 in which the air is injected during the latter portion of the engine expansion strokes through the engine spark plug openings, the air being timed and distributed by a valve mechanism operating in timed relation to the engine.

The invention which is the subject of this application provides different means for timing and distributing the air to the engine combustion chambers. One modification of the invention comprises a manifold to which compressed air is delivered and from which compressed air is conducted to each engine combustion chamber by passages connecting the manifold with each chamber, the injecting timing being accomplished by an air valve constructed in a manner similar to the engine intake valve and operated off the engine camshaft. This system will provide precise injection timing and will substantially eliminate the hysteresis effect which sometimes occurs in a system having long timing and distribution conduits.

A second modification of the invention uses an air manifold in a similar manner but controls the injection of air by means of solenoid actuated poppet valves connected with a spark plug type air injector, the solenoids being controlled by the engine distributor which supplies electrical impulses to the spark plugs for firing the fuel-air mixtures in the combustion chambers. In order to accomplish the desired timing the spark plug lead to any one spark plug controls the timing solenoid for an air injector associated with a combustion chamber which has been fired somewhat earlier. In a four stroke-cycle V-8 type engine, for example, the firing spark plug lead would actuate a solenoid for the cylinder which fired 90° of crank angle earlier. The air would then be injected at the proper time in the expansion stroke of that cylinder to obtain maximum benefits.

A third modification of the invention uses an air manifold to which compressed air is delivered from a suitable compressed air source and from which air is supplied to separate air introducing means for each combustion chamber. The air in the manifold provides the air which is to be injected into the combustion chambers. A separate air circuit is provided which times the injection of the air from the manifold by actuating a poppet valve which permits air to flow from the manifold to the various combustion chambers in the proper timed relation.

The system shown in the third modification may be further modified by providing a rotary air distribution and timing valve assembly of somewhat different construction and operation from that disclosed in my co-pending application referred to above. When using the two air system of the third modification, it has been found that in some instances the poppet valve will not close immediately when the actuating compressed air is cut off. The modified timing and distribution valve is provided with a passage which communicates with an engine intake manifold so that each actuating air conduit is alternately connected to pressurize air from the compressed air source and to vacuum from the engine manifold. This construction insures positive opening and closing of the poppet valve in the timed relation desired.

In the drawings:

FIGURE 1 is a schematic presentation of a system embodying the invention with a system being installed on a V-8 type engine.

FIGURE 2 is a partial section view taken through one of the engine combustion chambers in the direction of arrows 2—2 of FIGURE 1 and illustrating the portion of the air distribution system provided within the engine.

FIGURE 3 is a view taken in the direction of arrows 3—3 of FIGURE 2 and shows a portion of the valve actuating linkage of the system.

FIGURE 8 illustrates another modification of the system of FIGURE 1.

FIGURE 9 is a partial section view taken in the direction of arrows 9—9 of FIGURE 8 with parts broken away and illustrating the details of the air introducing means.

FIGURE 10 is a longitudinal section view of a modified air distribution and timing valve which may be used with the system of FIGURE 8.

FIGURE 11 is a transverse section view taken in the direction of arrows 11—11 of FIGURE 10.

Figure 4:
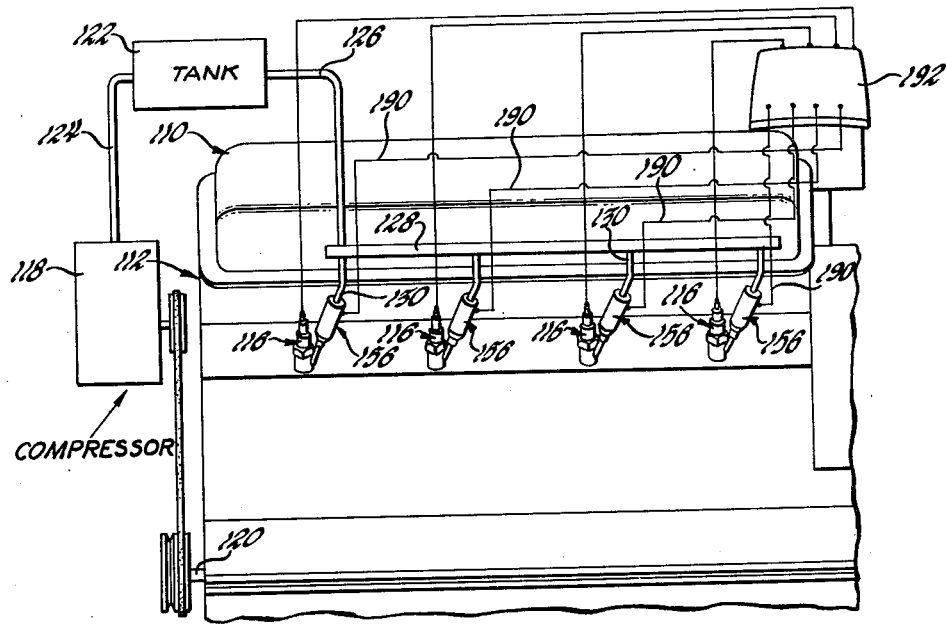
FIGURE 4 illustrates a modification of the system of FIGURE 1.

The system illustrated in FIGURE 1 is installed as a part of the engine 10. This engine may be of the V-8 type as illustrated, but also may be of any other multi-cylinder type. The engine 10 is provided with banks 12 of rows of cylinders 14 formed in the engine block 16. Suitable cylinder heads 18 are provided and cooperate with the engine pistons 20 to provide combustion chambers 22 in the cylinders 14. Each combustion chamber may be provided with a spark plug 24, an intake valve 26 and an exhaust valve 28. These valves may be conventional in construction and of any suitable arrangement. Each cylinder 14 is also provided with an air intake valve 30 which opens into the combustion chamber 22 and may be mounted in the head 18 in a manner generally similar to intake and exhaust valves 26 and 28. Valves 26, 28 and 30 are provided with valve closing springs 32 and are actuated by valve rocker arms 34, 36 and 38, respectively. These rocker arms are pivoted about a shaft 40 which is mounted on the cylinder head 18 and extends through the rocker arms for this purpose. Rocker arm push rods 42 engage the rocker arms and transmit the forces necessary to open the valve 30. Push rods 42 are connected with the valve lifters 44 which in turn engage the engine camshaft 46. Suitable cams 48 formed on camshaft 46 control the opening and closing of each of the valves 26, 28 and 30. The valve linkage arrangement for the air valve 30 is illustrated in the section view of FIGURE 2.

The cylinder head 18 is provided with an air inlet passage 50 for each cylinder 14. The discharge end of each passage 50 is controlled by movement of an air intake valve 30. A compressed air manifold 52 is mounted on head 18 so that it communicates with the intake end of each of the passages 50 through a manifold outlet port 54. Manifold 52 extends longitudinally along the bank 12 of engine cylinders so that it connects with the air inlet passage leading to each of the cylinders 14 to provide air to the combustion chamber 22 when valve 30 is opened. A suitable valve rocker arm cover 56 may also be provided on head 18.

The engine crankshaft 58 is suitably connected to drive the air compressor 60 to provide a source of compressed air. Air compressor 60 must be capable of delivering air under suitable pressures and in sufficient quantities to provide an efficient operating system. When the system is used on a typical automotive engine having a displacement of about 280 cubic inches, it has been found desirable to provide compressed air at a minimum pressure of 30 p.s.i. and in the range of 30 p.s.i. to 150 p.s.i. A delivered volume range of 1 cubic foot of air per minute per engine cylinder has been found to provide ample quantities of air in this pressure range. The compressor 60 should have a capacity to continually deliver air under these conditions when the engine is operating at idle and in the lower ending speed ranges.

Air may pass from compressor 60 through conduit 62 to a tank 64. This tank may act as a surge tank, or a compressed air reservoir, or both. Air is delivered under pressure from tank 64 to air manifold 52 by a suitable conduit 66. Air under pressure is therefore maintained in manifold 62 and each of the air passages 50 so long as the system is operating.

The cams 48 of engine camshaft 46 which control the opening and closing of air intake valve 30 are preferably so profiled and arranged as to open each valve 30 during the engine expansion stroke and either near the completion of normal combustion within the combustion chamber 22 or shortly thereafter. The valve 30 should remain open a sufficient time to permit a discharge of enough air into the combustion chamber to complete the combustion of the previously unburned hydrocarbons found in the combustion gases. A suitable timing has been found to utilize an air injection period by approximately 100° of engine crank angle with the center of the air injection period being approximately 38° before bottom dead center. As noted in my co-pending application referred to above, air injected under these conditions will reduce substantially all of the carbon monoxide to carbon dioxide and will also permit combustion of various unburned hydrocarbons which are not otherwise burned in the combustion chamber.

The modification illustrated in FIGURES 4, 5, 6 and 7 shows the system installed on the engine 110 which has bank 112 of cylinders including combustion chambers 114. The combustion chambers are each provided with spark plug assemblies 116 which also act as the means for introducing the compressed air into the combustion chambers. The air compressor 118 is driven from the engine crankshaft 120 and should have a capacity similar to the air compressor 60 described in the first modification. Air from compressor 118 is delivered to tank 122 through conduit 124. The air is discharged from tank 122 through conduit 126 to the air manifold 128 which extends longitudinally of the bank 112 of cylinders and may be mounted on the cylinder head or valve rocker cover if desired. Each spark plug assembly 116 is provided with an air conduit 130 which receives air from the manifold 128.

Figure 5:
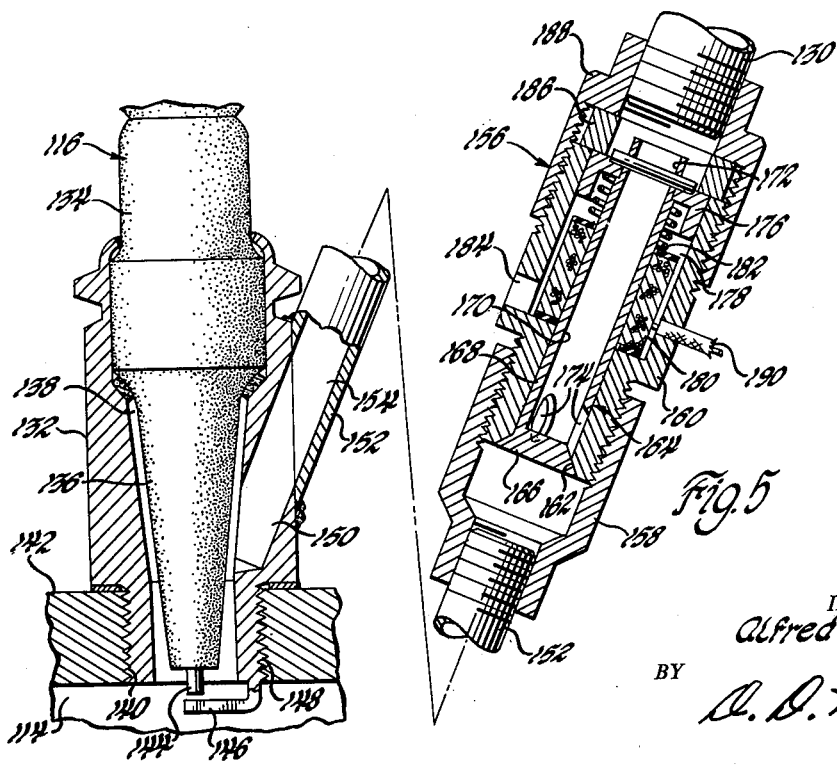
FIGURE 5 is a view of one of the air injectors used in the system of FIGURE 4 with parts broken away and in section.

The spark plug assembly 116 is illustrated in detail in FIGURE 5. The assembly includes the metallic shell 132 in which the spark plug insulation shell 134 is mounted and sealed in the conventional manner. The inner end 136 of shell 134 extends through metallic shell 132 and is inwardly spaced from the inner wall of shell 132 so as to provide an annular chamber 138 which is open to the combustion chamber 114 when the spark plug is installed through the spark plug opening 140 formed in the cylinder head 142 which provides one wall of the combustion chamber 114. The spark plug inner electrode 144 extends through insulation shell 134 and terminates adjacent and spaced from the outer electrode 146 which is secured to the threaded end 148 of metallic shell 132. A passage 150 is formed through metallic shell 132 and connects with annular chamber 138. A tubular member 152 is brazed or otherwise secured to the outer surface of metallic shell 132 so that its passage 154 communicates with the shell passage 150. This portion of the assembly construction is similar to a spark plug construction disclosed and claimed in my co-pending application referred to above.

A solenoid controlled poppet valve assembly 156 is secured to tubular member 152 and receives air from conduit 130. The valve assembly includes a support member 159 which may be threadedly secured to the end of tubular member 152. A valve body 160 is attached to support member 158 and has a valve passage formed through its lower end and terminating in a valve seat 162. The poppet valve 164 extends through valve body 160 and has a head 166 which is normally seated on valve seat 162. Valve 164 has a hollow stem 168 which extends upwardly through valve body 160 and includes an air passage 170 which is open at its upper end 172 to communicate with conduit 130. The lower end of air passage 170 terminates at head 166 and radially extending ports 174 are provided through the valve stem so that air may pass from passage 170 between the valve seat 162 and the valve head 166 when the valve is opened.

A valve piston 176 is secured to the upper end of valve stem 164 and reciprocates in the chamber 178 formed in the upper end of valve body 160 when the valve is opened and closed. A solenoid coil 180 is provided in the lower portion of chamber 178 and surrounds valve stem 164 so that the valve stem acts as a solenoid core. A compression spring 182 reacts against the upper end of solenoid coil 180 and the lower surface of piston 176 so as to urge valve head 166 into seating engagement with valve seat 162. Chamber 178 is vented to the atmosphere through port 184 in valve body 160 to permit free actuation of the valve and valve piston without interference from trapped air.

The upper end of valve body 160 has an annular seal 186 which seals the conduit connector 188 to the upper end of the valve body. The seal may extend inwardly so as to engage and cover an annular outer surface section of piston 176 so that a small piston area is exposed to air pressure from conduit 130 when the valve 164 is in the closed position. Spring 182 is sufficiently strong to hold the valve closed against the air pressure forces acting against the exposed surface of piston 176 and the back surface of valve head 166.

Figure 6:
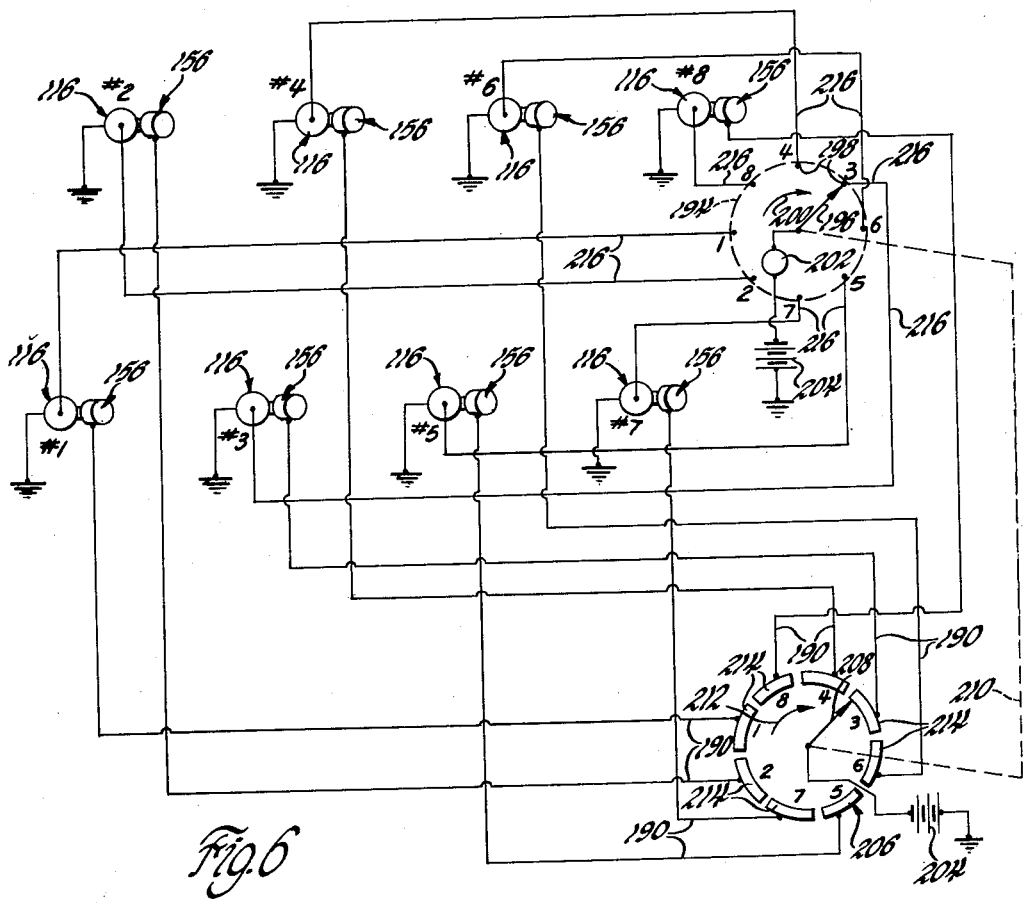
FIGURE 6 is a diagrammatic illustration of the circuitry of the system of FIGURE 4.

Solenoid coil 180 is connected with the electrical lead 190 from distributor 192 so that electricity passing through lead 190 energizes coil 180 and provides sufficient force to overcome spring 182. The details of the circuits which control solenoid coil 180 are illustrated in FIGURE 6. The distributor 192 includes an upper section 194 which contains the usual distributor rotor 196 and a series of distributor contacts 198 which are each successively engaged as the rotor moves in the direction indicated by arrow 200. The distributor is connected to a coil 202 in the normal manner and that coil is electrically connected to a source of electrical energy indicated by the reference numeral 204. Source 204 may be a generator or battery. The lower section 206 of the distributor 192 includes a rotor 208 which is connected to rotate together with rotor 196 of the upper section by suitable mechanical means such as a common shaft 210. Rotor 208 therefore rotates in the direction of arrow 212, which is the same direction as arrow 200 for the upper section. A circumferential series of contact plates 214 are provided in the distributor lower section which are engaged by rotor 208 as it rotates. Each of the contact plates 214 has one electrical lead 190 leading to one solenoid coil 180 in one valve assembly 156. Contact plates 214 each have an arcuate length equal to one-half the crank angle through which air introduction is to be accomplished. As illustrated in FIGURE 6, each plate may have an arcuate length no greater than 45° (less a small space to separate adjacent plates) when the system is used on an eight cylinder engine. Thus the maximum air injection period with this construction will be slightly less than 90° of crank angle.

In FIGURE 6 each spark plug assembly 116 is arranged schematically to represent the spark plugs in a V-8 engine. The spark plug high tension terminal leads 216 are connected to provide a firing order of 1-8-4-3-6-5-7-2. Although other firing orders may be used with such engines, the circuitry illustrated in FIGURE 6 will be discussed with the use of this firing order. The solenoid in each valve assembly 156 may be energized approximately at the time the next later spark plug fires and be de-energized approximately at the time the second later spark plug fires. Thus air injection into cylinder No. 3, for example, would be started at approximately the time when cylinder No. 6 is fired. The air injection would be completed and the air supply cut off to cylinder No. 3 at approximately the time when cylinder No. 5 is fired. This would give an air injection valve opening of approximately 90° of engine crank angle. This is accomplished by electrically energizing the lead 190 connecting with the valve assembly 156 for the No. 3 cylinder. At about the same time, the terminal lead 216 for the spark plug 116 of cylinder No. 6 is energized. The contact plate 214 for cylinder No. 3 remains in contact with the rotor 208 as that rotor rotates, keeping the circuit energized to the solenoid coil, which holds the air valve open for cylinder No. 3. This circuit may be connected to the suitable source of electricity 204, shown separately in the diafgram for clarity. As rotor 208 continues to move in the direction of arrow 210 concurrently with rotor 196 in the direction of arrow 200, it is electrically disconnected from the contact plate 214 for the cylinder No. 3 solenoid and then contacts the next contact plate 214 which is connected with another electrical lead 190 for the solenoid associated with cylinder No. 6. The steps are repeated for cylinder No. 6 and so on for each of the engine cylinders throughout an engine cycle of operation for each cylinder.

Figure 7:
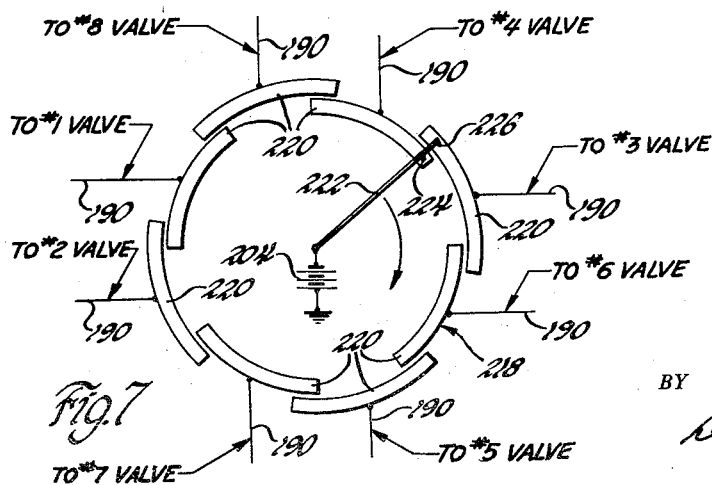
FIGURE 7 is a diagrammatic illustration of a portion of the circuit of FIGURE 6 and shows a modified air injection timing distributor.

If it is desired to introduce air into the cylinders for a period longer than 90° of engine crank angle, the distributor lower section modification 218 illustrated in FIGURE 7 may be used in place of the distributor lower section 206 illustrated in FIGURE 6. The distributor lower section 218 of FIGURE 7 provides for keeping each solenoid coil 180 energized for approximately 110° of engine crank angle. The contact plates 220 therefore extend arcuately for 55°. In order to accomplish this, the contact plates for alternately firing cylinders are positioned on one radius and the contact plates for the remaining cylinders are positioned on another radius and the rotor 222 is provided with contacts 224 and 226 positioned respectively on these radii. Using the same firing order as before, the contact plates for the No. 3, 5, 2 and 8 cylinders may be positioned on the outer radius. The contact plates for the No. 6, 7, 1 and 4 cylinders may be positioned on the inner radius. The ends of adjacent contact plates therefore overlap for 5°. Rotor 222, with its contact 224 and one plate 220, is illustrated as causing energization of the solenoid 180 for the valve assembly 156 associated with the No. 4 cylinder, and the solenoid is about to be de-energized.

The rotor contact 226 has just contacted plate 220 for the No. 3 cylinder solenoid so the air injection period has just begun for that cylinder. Other air injection timing arrangements may also be made if desired by providing the proper arcuate lengths of the contact plates 220. Either rotor 208 or rotor 220 may be offset arcuately from the distributor rotor 186 to obtain changes in overall injection timing if desired. The length of the contact plates 214 or 220 must be changed if the duration of each timing period is to be altered. In a four stroke-cycle six cylinder engine of the inline type it is common to use a firing order of 1-5-3-6-2-4. Since the firing interval is 120° of crank angle in such an engine, a distributor similar to that diagrammatically illustrated in FIGURE 6 may be used to obtain air injection periods approaching 120°. Similar arrangements of eelctrical circuitry may be made for other firing orders and for other engine types.

It is also possible to use the spark plug high tension terminal lead to actuate the solenoid coil 180 so that electricity passing through the terminal lead will energize a holding circuit which provides sufficient electrical energy to the coil 180 to hold the valve open for the desired period of time. This type of circuit is not illustrated in the schematic drawing and would be considerably more complicated than the circuit illustrated.

The electrical energy in the spark plug terminal leads may also be utilized to actuate a relay controlling a circuit which will operate to energize the coil 180 to move the valve 170 into the open position. By proper design of piston area for valve actuating piston 176 and a closely controlled air pressure, the valve system may be arranged to be held open by the air pressure for the desired period of time. In such a construction, the piston 176 would move downwardly to expose a greater piston area to air pressure from conduit 130. This pressure would have to be sufficient to hold the valve 164 in the open position until a pressure is obtained in combustion chamber 114 which is sufficient to close the valve. The piston area and force of spring 182, together with the supply of air pressure, may be so balanced that the exhausting pressure in the combustion chamber 114 during the exhaust stroke or the compression pressure in that chamber during the compression stroke is sufficient to close the valve. In either case the air injection would continue at least into a portion of the exhaust stroke, thus having air injection during the latter part of the expansion stroke to complete the burning of the hydrocarbons and including a scavenging effect during part of the exhaust stroke. It is consideerd preferable, however, to use the arrangements of FIGURES 6 and 7 to obtain more positive control of the air injection period.

The third modification of a system embodying the invention is schematically illustrated in FIGURE 8. The engine 310 may be of the V-8 type and includes banks 312 of cylinders 314 formed in the engine block 316. Suitable cylinder heads 318 may be provided to cooperate with the cylinders 314 and the reciprocating pistons contained therein to form combustion chambers 320. Spark plugs 322 may be provided for each combustion chamber and suitably energized to ignite the fuel air charges introduced into the cylinders. Air introducing mechanisms 324 may also be provided for each combustion chamber and one mechanism may connect with each combustion chamber through openings 326 provided for that purpose in cylinder heads 318. The engine crankshaft 328 may be suitably connected to an air compressor 330 to drive the compressor and provide compressed air to the tank 332 through conduit 334. Air compressor 330 must provide sufficient air quantities at sufficient pressures to satisfactorily operate the system. It has been found that the compressor should supply one-half to one cubic foot per minute of air per engine cylinder within a pressure range of 30 p.s.i. to 150 p.s.i. while the engine is operating at idle and low speed conditions in order to give the best results.

An air distribution and timing valve 336 may be driven by a driving member 338 which is in turn suitably connected to a portion of the engine 310 which rotates in timed relation to the engine. Drive member 338 is schematically illustrated as being connected to the driving mechanism for the engine distributor 340 so that the valve 336 will go through the complete cycle while the engine 310 operates throughout one complete cycle. Thus, in a four stroke-cycle engine the rotatable element of valve 336 will make one revolution while crankshaft 328 makes two revolutions.

Conduit 342 receives air from tank 332 and has conduit 344 connected therewith and leading to air distribution valve 336 to furnish compressed air to that valve. Conduit 346 is connected with tank outlet conduit 342 and conducts compressed air to the air supply manifold 348 which extends longitudinally along each engine bank 312. Manifold 348 is provided with conduits 350 which connect the manifold with the air introducing mechanism 324 in parallel.

The compressed air discharge ports of air distribution and timing valve 336 are connected with a series of conduits 352. Each conduit 352 is connected to one of the air introducing mechanisms 324 to supply timed air for actuating those mechanisms.

One of the air introducing mechanisms 324 is shown in detail in FIGURE 9. The mechanism includes an adapter 354 which is installed through opening 326 and seals against the outer surface of cylinder head 318. A valve body 356 is attached to adapter 354 by suitable means such as the threaded section 358. An air chamber 360 is formed transversely within valve body 356 and connects with an air supply passage 362 in which conduit 350 is received. Manifold 348 supplies compressed air to air chamber 360 through conduit 350 and passage 352 and maintains air under pressure in that chamber at all times while the system is operating.

A valve chamber 364 is provided in valve body 360 adjacent threaded section 358 and a valve seat 366 is formed on the web 368 separating valve chamber 364 and air chamber 360. Valve seat 366 is on the valve chamber side of web 368. A poppet valve 370 extends through valve passage 372 formed in web 366 and web 374 which forms a wall for air chamber 360 opposite web 368. A valve actuating chamber 376 is formed in valve body 356 on the opposite side of web 374 from air chamber 360. Chamber 376 has a suitable valve seal and guide 378 in the end thereof adjacent web 374 through which the stem 380 of valve 370 extends. A valve actuating piston 382 is received in the upper end of chamber 376 and is secured to the upper end 384 of valve 370. The side wall 386 of piston 382 is in engagement with cylinder wall 388. Wall 388 provides a piston guide and seal for piston 382 in chamber 376. A piston cap 390 is secured and sealed to the upper end of valve body 356 to define a piston actuating chamber 392 and also to provide suitable connecting means for connecting conduit 352 with the piston actuating chamber.

A valve closing spring 394 is mounted about valve stem 380 intermediate valve seal and guide 378 and piston 382 so as to urge valve 370 into the closed position. The lower portion of chamber 376 is vented to the atmosphere through port 396.

Valve 370 has its lower end formed to provide valve head 398 which is shaped to seat against valve seat 366. The valve stem portion 400 extending through air chamber 360 when the valve is closed is necked down so that the valve stem clears web 368 when the valve is opened and air can flow from air chamber 360 through web 368 and past valve seat 366 and valve head 398 into the valve chamber 364 and then through passage 402 in adapter 354 and into combustion chamber 320.

In the operation of the system, compressed air is maintained within the manifold 348 and in each of the air chambers 360 provided in each of the air introducing mechanisms 324. Air is therefore maintained at full pressure up to valve head 398 but is not permitted to pass beyond that point until the valve is opened. An air distribution and timing valve 336 is driven in timed relation with the engine and air under pressure is conducted through conduit 352 to actuating chamber 392 in mechanism 324. The air moved through conduit 352 is so timed that it will act on piston 382 to overcome the force of spring 394 and the combustion chamber gas pressures during the engine expansion stroke in the timed relation described in detail in my co-pending application referred to above. The introduction of air into the combustion chamber at this time will permit the otherwise unburned hydrocarbons contained in the combustion gases to more completely burn, resulting in substantial elimination of carbon monoxide in the exhaust gases as well as hexane and other unburned hydrocarbons. This additional burning will increase the expansion pressure in the engine. Engine efficiency is increased since the energy normally discarded in the form of unburned hydrocarbons in the exhaust system is utilized in the combustion chamber during the power stroke. When the air injection period is completed, air distribution and timing valve 336 closes the inlet end of conduit 352 and the pressure within actuating chamber 392 decreases sufficiently to permit spring 394 to close valve 370.

The air distribution and timing valve illustrated in FIGURES 10 and 11 overcomes a disadvantage of using the air distribution and timing valve disclosed and claimed in my co-pending application noted above in a two air system of the type illustrated in FIGURE 8. If valve 336 closes the inlet end of conduit 352 and tightly seals that end at the completion of the air injection period and no leak-by is permitted at piston 382, a column of air under pressure will be maintained in conduit 352 and actuating chamber 392 for a time such that valve 370 may not close with the exact timing desired. This timing is somewhat critical since a complete cycle takes place each two seconds when a four stroke-cycle eight cylinder engine is operated at 480 r.p.m., and in one-half second at 1920 engine r.p.m. To overcome this situation, the distribution and timing valve 404 of FIGURES 10 and 11 alternately communicates each conduit 352 with pressurized air and engine intake manifold vacuum to provide positive opening and closing of poppet valve 370.

Conduit 344 of the system shown in FIGURE 8 is connected to the end 406 of valve housing 408. A rotor 410 is rotatably mounted in housing 408 and driven by the driving member 338. Rotor 410 has a longitudinal recess 412 extending axially through one end thereof adjacent housing end 406. A rotor extension 414 may be provided on the end of rotor 410 opposite driving member 338. Extension 414 may extend into a recess formed in housing end 406 to locate the rotor and provide a bearing surface. Conduit 344 connects with the boss recess and the rotor longitudinal recess 412. A radially extending slot 418 is formed in rotor 410 from recess 412 to the rotor outer surface 420. Slot 418 may be of approximately the same length as recess 412, which extends through the rotor to a point adjacent the rotor driving end to which driving member 338 is attached.

Valve housing 408 has a plurality of equally spaced radially extending passages 422 formed therein, the number of passages being equal to the number of air induction mechanisms 324 being used. One conduit 352 is connected to each passage 422 so that compressed air may be conducted to each introducing mechanism 324. Passages 422 are illustrated as being located along a pitched line on valve housing 408 in order to facilitate the installation of fittings or other hardware which connect conduit 352 to the valve housing passages. It is for this reason that slot 418 and recess 412 are preferably formed through a substantial portion of the length of rotor 410. If desired, however, and space permits, passages 422 may be positioned in a circumferential plane. As the rotor rotates, slot 412 will successively communicate with each of the passages 422. These passages are so connected to mechanisms 324 that the mechanisms are actuated in timed relation with the stroke-cycle of each engine cylinder. Compressed air is maintained in recess 412 and slot 418 at all times. As the slot 418 connects with one of the passages 422, air under pressure is transmitted to the piston actuating chamber 392 in the associated introducing mechanism and the valve 370 is opened to admit air to the combustion chamber. The rotor 410 may rotate counterclockwise as indicated by arrow 424 in FIGURE 11. When slot 418 breaks communication with passage 422, a compressed air column is maintained in conduit 352 and valve 370 continues to be held in the open position by the force exerted by this column of air. In order to accomplish this, rotor 410 must fit closely within housing 408 to minimize air leaks while permitting the rotor to rotate.

A key-way type slot 426 is formed in the outer surface of rotor 410 in a longitudinal direction and parallel to the rotor axis. When the valve is to be used with a four stroke-cycle engine, key-way slot 426 is positioned axially beyond slot 418 an amount equal to one-half the desired crank angle during which air is to be injected into the combustion chamber. Thus the angle formed at the axis of recess 412 between the centers of slots 418 and 426, as viewed in FIGURE 11, would be 50° if the air injection period is to take place through 100° of engine crank angle.

Valve housing 408 has an annular recess 428 formed around boss 416 and separated and sealed from the pressurized air inlet 430 which is formed centrally of the boss. A vacuum conduit 432 is connected with recess 428 through housing passage 434 and is connected to a suitable vacuum source such as the engine intake manifold 436. When the engine and system is operating, a vacuum is therefore maintained in recess 428 and slot 426. After air from slot 418 has pressurized a valve actuating chamber 392 and its associated conduit 352 through a passage 422, slot 426 moves into communication with that passage 422. The time will be 50 rotor degrees later, or 100 crank angle degrees later, if that air injection timing is being used. When the positive air pressure acting against valve piston 382 is relieved, spring 394 immediately acts to close the valve and cut off the supply of compressed air to the combustion chamber 320 from the air supply manifold 328. This system provides positive opening and closing action of the valve 370 in exact timed relation with the engine.

What is claimed is:
1. In combination with an internal combustion engine having an engine block and a cylinder head and cylinders formed in said block and pistons reciprocably received within said cylinders and cooperating with said block and said head to define combustion chambers, an air injection system comprising a source of compressed air driven by said engine, means for introducing air from said source into said combustion chambers in timed relation with the stroke-cycle of said engine, a compressed air manifold mounted on said engine and extending to points adjacent said engine cylinders and said introducing means, conduit means connecting said compressor with said manifold and said manifold with each of said compressed air introducing means, means for timing the introduction of compressed air from said manifold into said combustion chambers during a portion of the expansion stroke of said engine, said means for timing the introduction of compressed air from said manifold into said combustion chambers comprising, a rotary timing and distribution valve receiving compressed air from said source and having compressed air delivery conduit means connecting with said air introducing means, said air introducing means having valve means therein for controlling the admission of compressed air from said manifold to said combustion chambers and valve actuating means actuated by compressed air from said distribution and timing valve for actuating said valve means in timed relation to said engine.

2. The combination of claim 1, said timing means further comprising a vacuum chamber formed in said timing valve and connecting with said delivery conduits a predetermined period of engine crank angle time after compressed air is delivered to said introducing means therethrough for evacuating said delivery conduits and relieving air pressure on said valve actuating means to permit closure of said valve means, said vacuum chamber being connected to a source of vacuum on said engine.

3. An air injection system for injecting compressed air into the combustion chambers of a multi-cylinder internal combustion engine in timed relation wtih the engine so that the air is injected during the expansion stroke and after normal fuel combustion has been completed in the combustion chambers, said system comprising an air compressor adapted to be driven by the engine, an air manifold having a first discharge conduit connecting said air compressor therewith and supplying compressed air thereto, a plurality of second discharge conduits each adapted to connect said manifold with one engine combustion chamber, means for introducing compressed air from said second conduit means into each engine combustion chamber in timed relation with the operation of the engine only during the expansion stroke and after normal fuel combustion has been completed in the combustion chambers, said introducing means including a valve for each combustion chamber and valve operating means actuated in timed relation with said engine, said valve operating means comprising a valve actuating piston having compressed air from said second conduit means acting thereon and providing at least a portion of the total force required to open said valve.

4. The system of claim 3, said valve operating means further comprising a spark plug high tension lead and a solenoid coil disposed about the stem of one of said valves and adapted to be energized by electrical energy conducted in said high tension lead electrically connecting the engine distributor and the spark plug associated with a combustion chamber fired next after the combustion chamber having said one valve associated therewith.

References Cited in the file of this patent

UNITED STATES PATENTS

| | | |
|---|---|---|
| 1,799,761 | Pew | Apr. 7, 1931 |
| 2,011,986 | Schwarz | Aug. 20, 1935 |
| 2,360,695 | Linden et al. | Oct. 17, 1944 |
| 2,579,155 | Newell | Dec. 18, 1951 |
| 2,630,825 | Stephens | Mar. 10, 1953 |
| 2,818,881 | Bonner et al. | Jan. 7, 1958 |
| 2,884,952 | Mason et al. | May 5, 1959 |